United States Patent [19]

Mojadad

[11] Patent Number: 4,522,233
[45] Date of Patent: Jun. 11, 1985

[54] MULTI-POSITION PLUG VALVE
[75] Inventor: Yousef Mojadad, Lenexa, Kans.
[73] Assignee: Smith & Loveless, Inc., Lenexa, Kans.
[21] Appl. No.: 427,635
[22] Filed: Sep. 29, 1982
[51] Int. Cl.³ .............................................. F16K 11/083
[52] U.S. Cl. ........................... 137/625.47; 137/625.18; 137/625.2
[58] Field of Search ...................... 137/625.46, 625.41, 137/625.47, 614.2, 614.18

[56] References Cited

U.S. PATENT DOCUMENTS

| 1,233,702 | 7/1917 | Pickup | 137/625.47 X |
| 2,153,885 | 4/1939 | Goldberg et al. | 251/56 |
| 2,630,325 | 3/1953 | Reynolds | 137/625.46 X |
| 2,893,429 | 7/1959 | Schaffer | 137/625.46 X |

FOREIGN PATENT DOCUMENTS

| 798662 | 11/1968 | Canada. | |
| 995560 | 8/1976 | Canada. | |
| 1000589 | 11/1976 | Canada. | |
| 1041871 | 11/1978 | Canada. | |
| 921239 | 12/1954 | Fed. Rep. of Germany | 137/625.46 |
| 596291 | 7/1959 | Italy | 137/625.47 |

*Primary Examiner*—Arnold Rosenthal
*Attorney, Agent, or Firm*—Dressler, Goldsmith, Shore, Sutker & Milnamow, Ltd.

[57] ABSTRACT

An improved multi-position plug valve is disclosed which greatly facilitates fluid flow control. In the preferred embodiment, the valve is adapted for connection with three individual pipes or conduits, and another main pipe or conduit. The valve includes a rotatable valve plug positioned within a valve body which can be selectively positioned for effecting fluid communication between any selected one or ones of the three individual pipes and the main pipe. The present valve is suited for use in a very wide variety of applications, and provides significant fabrication, installation and maintenance savings when compared with equivalent multi-valve systems heretofore required to provide equivalent flow control.

14 Claims, 13 Drawing Figures

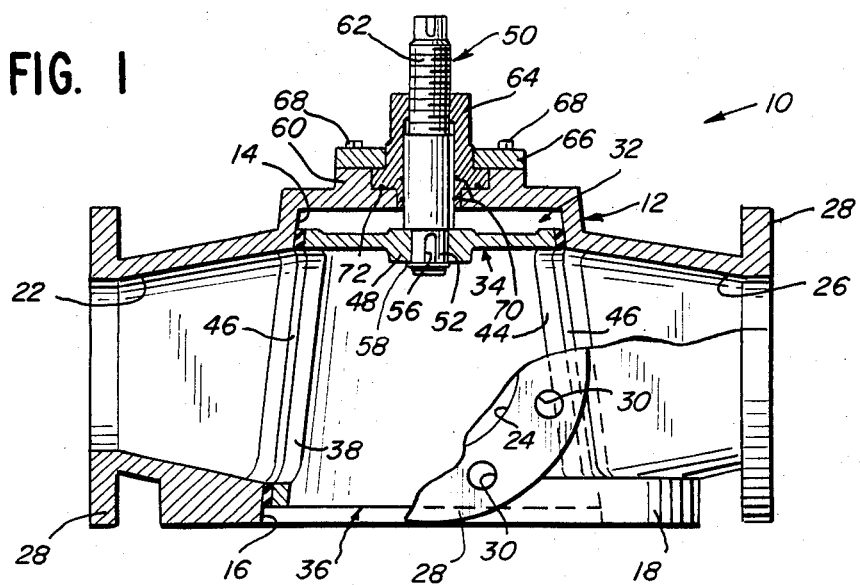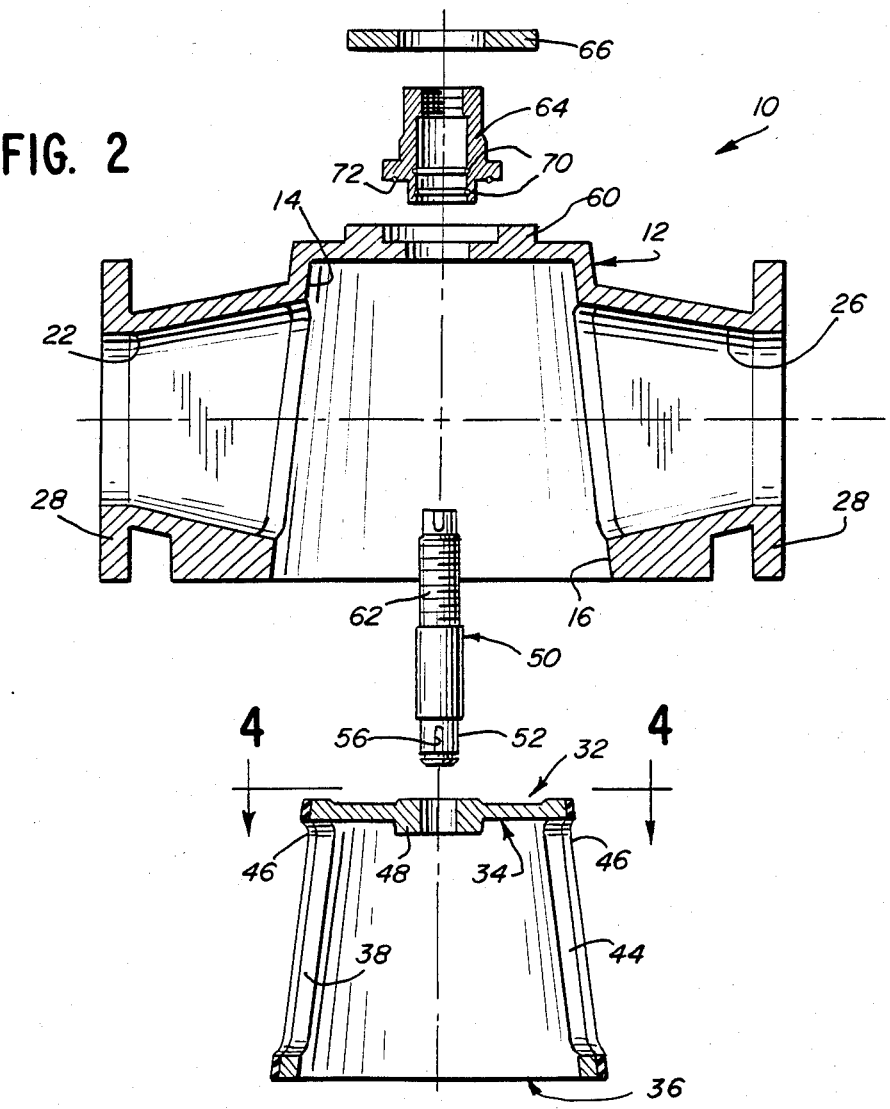

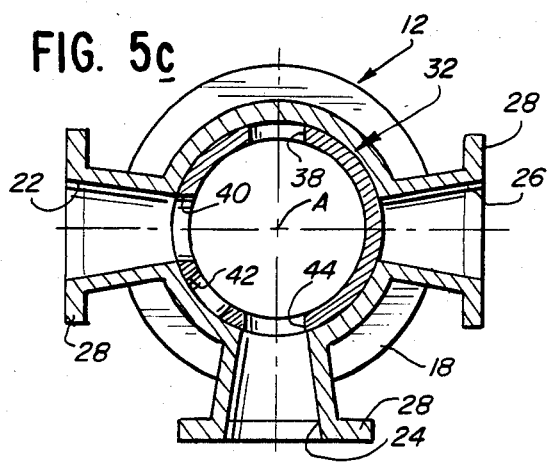
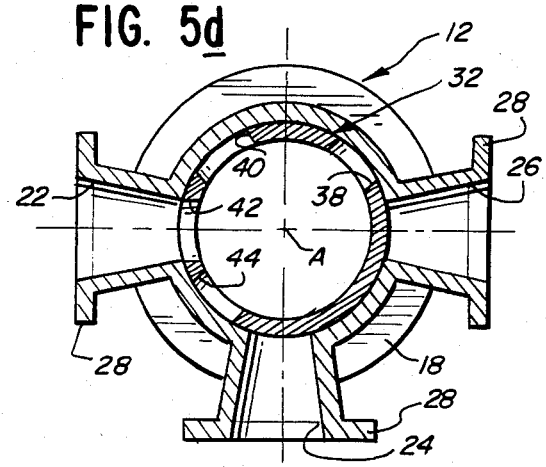
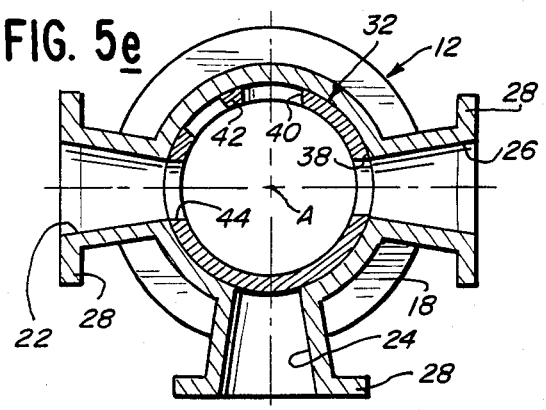
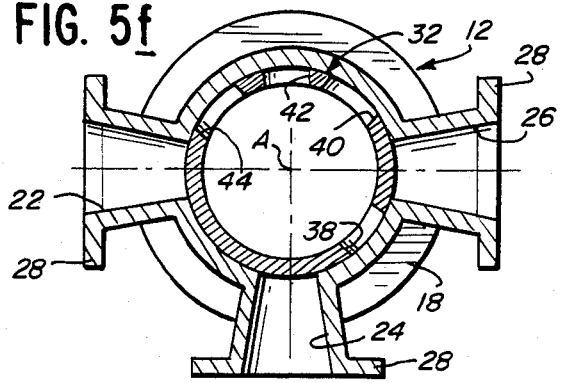
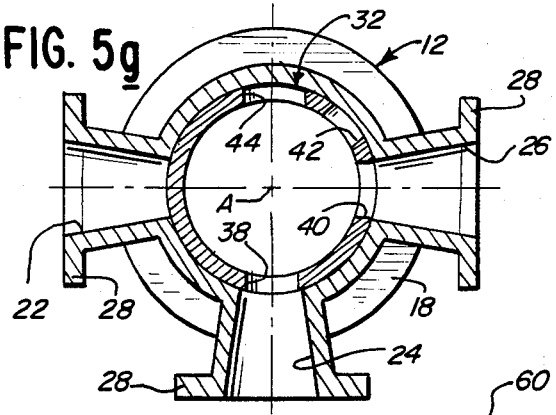
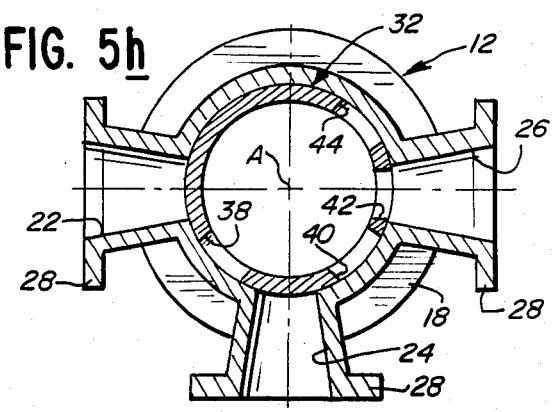
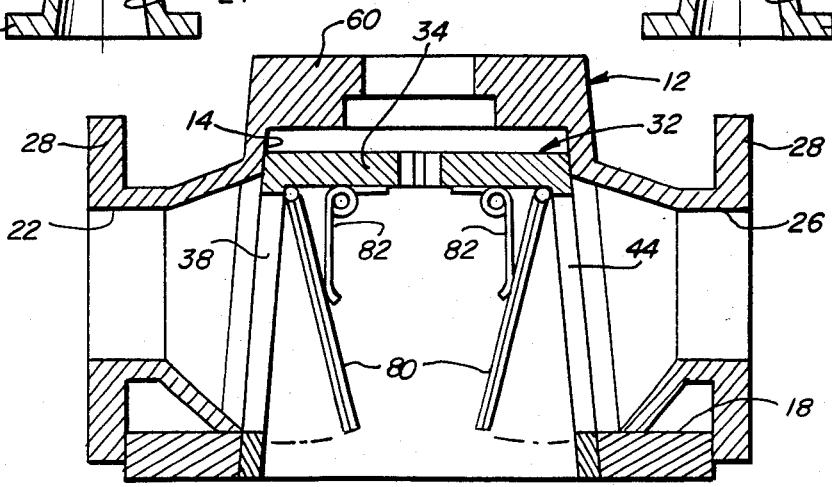

MULTI-POSITION PLUG VALVE

TECHNICAL FIELD

The present invention relates generally to valves for controlling fluid flow, and more particularly to a multi-position plug valve which permits selective fluid communication between a plurality of individual valve ports and a main port in any desired combination.

BACKGROUND OF THE INVENTION

Various valve constructions and arrangements are known for controlling the flow of fluids such as liquids through associated piping and conduits. In certain applications, it can be desirable to provide for selective fluid communication between one or more of a plurality of individual pipes and another main pipe. This can be accomplished by providing each of the individual pipes with its own respective isolation valve, and then joining the valves together by a suitable T-connection, header, or the like for communication with the main pipe. In some applications where it is desired to prevent reverse flow within the individual pipes, suitable flow check mechanisms can be provided so that fluid flow is only possible in one direction.

Although arrangements of the above description are very commonly employed to permit selective fluid communication between the individual pipes and the main pipe, the drawbacks of such an arrangement will be readily appreciated. Because individual isolation valves are provided for each of the individual pipes, fabrication, installation, and maintenance expenses can be relatively high. Additionally, the amount of space required for this typical arrangement can complicate installation. The expense is further compounded if each of the individual pipes must be provided with a suitable flow check mechanism. In use, it is frequently necessary to operate each of the individual valves when it is desired to alter the fluid communication between individual pipes and the main pipe. Naturally, this detracts from convenient operation of the arrangement, and may even result in some uncertainty as to which of the individual pipes are joined at any given time to the main pipe.

A further consideration which must be made during the design and installation of pipe valving arrangements relates to the service requirements of the system. In many applications, the nature of the fluids being piped and controlled dictate the type of valving that is suitable for use. For example, in facilities which handle and treat sewage and other wastes, or otherwise abrasive and corrosive liquids, the equipment installed must be specially adapted for the rigorous service requirements. Not only does this frequently limit the type of isolation valves which can be suitably employed, but it also can significantly increase the maintenance requirements for the equipment. Naturally, the use of a number of individual valve mechanisms which must each be periodically serviced complicates and increases the cost of effective maintenance.

In some installations, so-called three-way or four-way valves can be used for effecting communication between plurality of individual pipes and a main pipe. While such arrangements desirably reduce the number of individual components in a system, such valves are limited in the selection of desired flow direction.

In view of the above, the introduction of a single multi-position valve unit which can be employed for providing selective communication between a plurality of individual pipes and a main pipe in any combination is particularly desirable. It is particularly advantageous if such a valve unit can be easily installed and maintained, particularly if the unit is suited for use in applications such as sewage handling and treatment in which the control of corrosive and/or abrasive materials is required.

SUMMARY OF THE INVENTION

In accordance with the present invention, an improved multi-position plug valve construction is disclosed which permits selective communication between a plurality of individual pipes and a main pipe in any desired combination. The present valve may be readily fabricated, installed, and maintained, and is particularly suited for application in sewage handling and treatment facilities, petroleum pumping systems, and other industrial applications. However, the present valve construction can be readily adapted for use in other applications, such as pneumatic, hydraulic, and automatic transmission systems. If desired, the valve may be fabricated with an arrangement of internal flow check mechanisms, thereby obviating the need for the installation of such mechanisms apart from the valve.

The present multi-position valve is preferably configured as a so-called four-way plug valve, and includes a generally bell-shaped valve body and a valve plug which is adapted to be rotatably positioned within an interior bore defined by the valve body. The valve body further defines a plurality of valve ports which are spaced about the rotational axis of the valve plug, and which are each adapted for connection to an individual pipe or conduit. The valve body further defines a main port into which the interior bore of the valve body generally opens. The main port of the valve body is adapted for connection with a main pipe or conduit, with selective rotational positioning of the valve plug within the valve body providing fluid communication between the valve ports and the main port via the interior of the valve plug in any desired combination.

The valve plug includes an upper portion and a depending skirt portion, and is adapted to fit within the interior bore of the valve body for selective rotation with respect thereto. The interior of the valve plug opens into the main port defined by the valve body, with communication between the valve ports and the main port provided via the interior of the valve plug by a plurality of plug ports defined by the skirt portion of the valve plug. The plug ports are spaced about the rotational axis of the valve plug, the plug ports being adapted for alignment with the valve ports of the valve body so that selective rotational positioning of the valve plug within the body permits selective communication of the valve ports with the main port via one or more of the plug ports through the interior of the valve plug. The plug ports are arranged with respect to the valve ports of the valve body such that any selected one or selected ones of the valve ports can be placed in communication with the main port of the valve body.

Selective rotational positioning of the valve plug within the valve body is effected by rotation of an operating shaft which is affixed to the upper portion of the valve plug and extends through the valve body. Preferably, a suitable index mark is provided on the operating shaft externally of the valve body for selective alignment with suitable indicia provided on the valve. In this manner, the one or ones of the valve ports which are joined in communication with the main port can be readily visually discerned, facilitating convenient and efficient operation of the valve.

In order to maintain the valve plug in any selected position, a locking arrangement is provided which cooperates with the operating shaft of the valve. The locking arrangement comprises a locking or jacking collar which is mounted for rotation on the valve body. The locking collar threadably engages the operating shaft of the valve, and cooperates with the operating shaft for effecting movement of the valve plug axially of its rotational axis. In this fashion, the valve plug can be moved into and out of rotation-preventing engagement with the interior bore of the valve body. Thus, operation of the valve is effected by operating the locking collar, repositioning the valve plug by rotating the operating shaft, and re-rotating the locking collar.

If desired, flow check means can be provided integrally with the valve unit. As disclosed herein, flow check means are provided by a plurality of spring-biased, flap-like members mounted on the interior of the valve plug, with each of the flap-like members respectively associated with and positioned adjacent each of the plug ports defined by the valve plug skirt portion. The flow checks are spring biased into flow-preventing relation across the respective plug port to prevent flow from the interior of the valve plug into the valve ports of the valve body. The flow checks can be provided if it is desired to prevent reverse from from the main port into the valve ports, or from any one of the valve ports into another one of the valve ports.

Numerous other advantages and features of the present invention will become readily apparent from the following detailed description of the invention and embodiments thereof, from the claims and from the accompanying drawings.

BRIEF DESCRIPTION OF THE DRAWINGS

FIG. 1 is a front elevational view in partial cross-section of the plug valve of the present invention;

FIG. 2 is an exploded assembly view of the plug valve illustrated in FIG. 1;

FIGS. 5a-5h are diagrammatic views illustrating the various operational modes of the present plug valve; and FIG. 6 is an elevational view in partial cross-section illustrating an alternate embodiment for the valve plug of the present plug valve.

DETAILED DESCRIPTION

Figure 3:
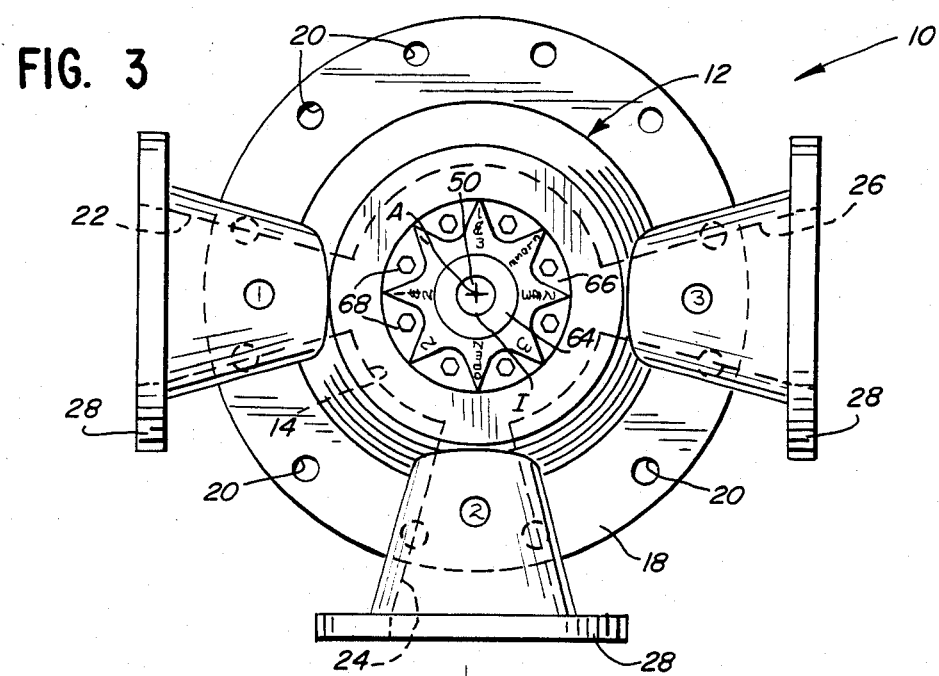
FIG. 3 is a top plan view of the present plug valve.

While the present invention is susceptible of embodiment in various forms, there are disclosed in the drawings and hereinafter described preferred and alternate embodiments, with the understanding that the present disclosure is to be considered as an exemplification of the invention, and is not intended to limit the invention to the embodiments illustrated.

It will be noted that for clarity of description, terms such as upper and lower are used in the present disclosure with reference to the orientation of the present plug valve unit as illustrated in the accompanying drawings. However, it will be appreciated that the present valve construction can be used in service in virtually any spacial orientation, and reference to particular spacial orientations in the present disclosure should not be interpreted as limiting the orientation in which the present valve unit can be manufactured, stored, shipped, or installed.

With reference to the drawings, therein is illustrated the multi-position plug valve 10 embodying the present invention. Plug valve 10 is sometimes referred to as being a "four-way" valve in that in the presently preferred embodiment it is adapted for connection with four separate pipes or conduits. As will be described, plug valve 10 is adapted for connection with three individual pipes and a fourth main pipe in order to provide selective fluid communication between any one or two, or all three of the individual pipes and the main pipe. In this manner, the present valve unit can be readily employed to replace three or more individual isolation valves and associated T-connections or headers which might otherwise be necessary for providing the same selective fluid communication function. Notably, the present valve unit is particularly suited for service in applications where control of abrasive, corrosive, or otherwise damaging liquids is required, such as in sewage handling and treatment facilities. However, the ease of fabrication, operation, and maintenance of the present plug valve readily accommodates its use in a wide variety of applications.

The present plug valve can be readily manufactured from cast iron, cast steel, stainless steel, cast bronze, synthetic materials, or a combination of materials, with consideration given to the particular application in which it is employed. Significantly, the elimination of three separate isolation valves and an associated connection header or side outlet tee desirably reduces the space required for piping, enhances the reliability of the piping system, and reduces the cost of the system. Ease of operation is greatly facilitated by the straightforward manner in which desired fluid communication is selected.

The present plug valve 10 includes a valve body 12 which is adapted for connection with associated piping. In the presently preferred embodiment, valve body 12 defines a generally frusto-conical interior bore 14 which is adapted to receive a valve plug, as will be described. As will be appreciated, interior bore 14 can be other than frusto-conical, such as cylindrical or parabolic.

Interior bore 14 of valve body 12 generally opens into a main port 16 defined by the valve body. The valve body preferably includes a flange 18 having fastener holes 20 which facilitate connection of the valve to an associated pipe or conduit, hereinafter referred to as the main pipe. The present valve effects selective communication between a plurality of individual pipes connected to the valve and the main pipe.

Valve body 12 further defines a plurality of generally co-planar valve ports each of which is adapted for connection with an individual pipe. Specifically, valve body 12 defines first, second, and third valve ports 22, 24, and 26 which are circumferentially spaced about the rotational axis A of the valve plug which is received by the interior bore 14 of the valve body. The valve body includes a plurality of flanges 28 respectively associated with each of the valve ports 22, 24, and 26 for connecting the valve with the associated piping. Flanges 28 define fastener holes 30 (FIG. 1) for effecting such connections. As noted, the centerlines of valve ports 22, 24 and 26 are generally coplanar, with the centerline of main port 16 extending generally perpendicularly to the plane of the valve ports. Bearing in mind that the rotational axis A of the valve plug to be received within interior bore 14 is aligned with the centerline of the interior bore, it will be appreciated that first and third valve ports 22 and 26 are generally diametrically opposed with respect to the rotational axis of the valve plug, while second valve port 24 is disposed intermediate valve ports 22 and 26 and at generally right angles thereto.

In order to effect selective fluid communication between the valve ports and the main port of the valve body 12, the present plug valve includes a valve plug 32 which is received within interior bore 14. Valve plug 32 is generally bell-shaped, and includes an upper portion 34, which may be provided with spaced reinforcing ribs 35 if desired (FIG. 4), and a depending skirt portion 36 which is complemental to interior bore 14. Thus, in the illustrated embodiment skirt portion 36 is generally frusto-conical, although cylindrical or parabolic configurations may be alternately employed.

The interior of valve plug 32 opens into main port 16 of valve body 12, with selective fluid communication between the valve ports of the valve body 12 and the main port 16 effected via the interior of the valve plug 32. To this end, the skirt portion 36 of the valve plug 32 defines a plurality of spaced plug ports which are adapted for alignment with the valve ports 22, 24, and 26 attendant to selective rotational positioning of the valve plug 32 within valve body 12. Specifically, skirt portion 36 defines first, second, third, and fourth plug ports 38, 40, 42, and 44. Each of the plug ports can have any of a variety of specific configurations, but it is preferred that each is sufficiently large in dimension so as to extend vertically substantially across each of the valve ports of the valve body where they join the interior bore 14.

Figure 4:
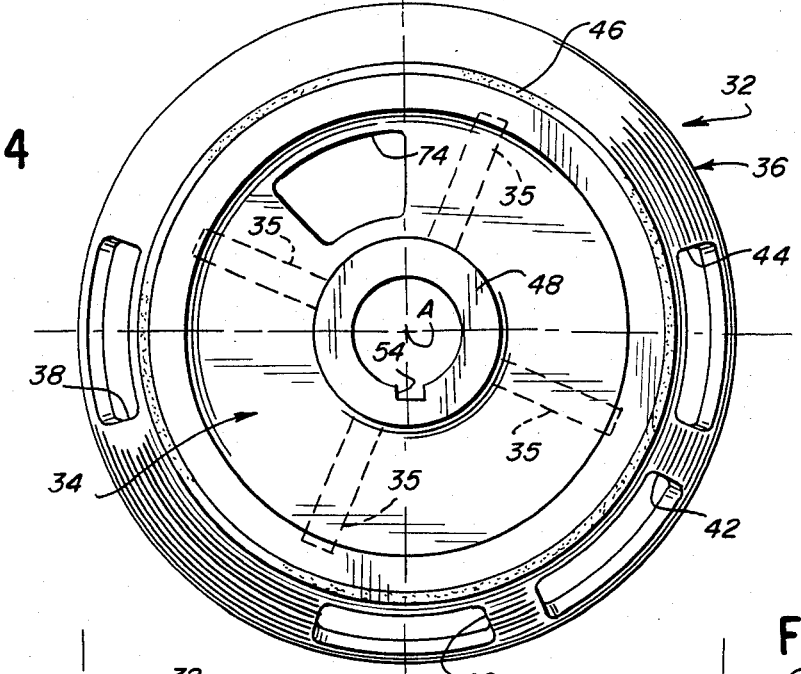
FIG. 4 is a view taken along lines 4—4 of FIG. 2 illustrating the valve plug of the present plug valve.

The positioning of the plug ports defined by skirt portion 36 provides for selective communication of the various valve ports of the valve body when the valve plug 32 is rotatably positioned within valve body 12. As best illustrated in FIG. 4, first plug port 38 is diametrically opposed to fourth plug port 4 with respect to the rotational axis A of the valve plug 32. Second plug port 40 is positioned intermediate the first and fourth plug ports 38 and 4 and at generally right angles thereto with respect to rotational axis A. The third plug port 42 is disposed intermediate the second and fourth plug ports 40 and 44, and is positioned at approximately a 45 degree angle relative to each of the second and fourth plug ports with respect to the rotational axis A of valve plug 32.

In order to effect proper sealing engagement of valve plug 32 with the interior bore 14 of valve body 12, the skirt portion 36 of valve plug 32 is preferably provided with a suitable elastomeric outer surface. Such an elastomeric surface can comprise neoprene or the like vulcanized to the skirt portion 36 and thereafter shaped, or the surface can be formed to the desired configuration in the vulcanizing die.

In order to effect selective rotational positioning of valve plug 32 within valve body 12, the valve includes an operating shaft 50 which is connected to the valve plug 32 and extends through the valve body 12. Operating shaft 50 is affixed to a hub 48 of the upper portion 34 of the valve plug 32, with shoulder portion 52 of the operating shaft fitting within the hub 48. Suitable keyways 54 and are respectively provided on the hub 48 and the shoulder portion 52 for receiving a key so that rotation of operating shaft 50 effects rotation of valve plug 32. A retaining clip 58 or like retaining means is provided so that the operating shaft 50 is securely connected to the valve plug 32.

Operating shaft 50 extends from valve plug 32 through an upper portion 60 of the valve body 12. Rotation of operating shaft 50 by a suitable wrench or handle (not shown) effects selective rotational positioning of valve plug 32.

In order to maintain the valve plug 32 in its selected position within valve body 12, the present plug valve unit includes a locking arrangement for preventing rotation of the valve plug. Notably, the locking arrangement effects movement of the valve plug axially of its rotational axis A into and out of rotation-preventing relation with the interior bore 14 of valve body 12. This is provided by a locking or jacking collar 64 mounted for rotation on the upper portion 60 of the valve body 12 which cooperates with a threaded shank 62 of operating shaft 50. Locking collar 64 threadably engages the threaded shank 62 of operating shaft 50, and operates through the shaft 50 to effect axial movement of the valve plug 32. A top plate 66 secured by fasteners 68 to the valve body 12 maintains locking collar 64 in position on the valve body. Suitable O-ring seals 70 are provided to effect sealing between the locking collar 64 and the operating shaft 50, with a suitable O-ring seal 72 provided for effecting sealing between the locking collar 64 and the upper portion 60 of the body 12.

Operation of the present plug valve 10 is effected in a very convenient and straightforward manner by selective rotation of locking collar 64 and operating shaft 50. Suitable wrenches or handles (not shown) are employed for this purpose. With a suitable handle placed on both the operating shaft 50 and the locking collar 64, the operating shaft is held stationary while the locking collar 64 is turned a sufficient amount (about one-quarter to one-half turn) so that the mating threads of the locking collar and operating shaft act to urge the operating shaft and valve plug 32 downwardly and axially of the rotational axis A of the valve plug 32. In this manner, valve plug 32 is disengaged from the valve body 12 so that it can be rotated, with the weight of the valve plug supported by locking collar 64. Preferably, suitable indicia are provided on the valve body (such as those illustrated on top plate 66 in FIG. 3) as well as on the operating shaft (note index mark I on operating shaft 50 in FIG. 3) so that selective rotational positioning of the valve plug 32 can be easily and reliably effected.

After valve plug 32 has been repositioned to effect the desired opening or closing of the various valve ports defined by valve body 12, the operating shaft 50 is again held by its handle or wrench, and the locking collar 64 rotated in the direction opposite its initial unlocking direction of rotation to draw the valve plug 32 into the valve body 12 and into locking engagement with the valve body. If desired, a separate locking collar or locking set-screw can be provided in association with locking collar 64 to prevent its unintended rotation.

Notably, the upper portion 34 of valve plug 32 defines at least one opening, such as 74 (FIG. 4), which accommodates equalization of fluid pressure between the interior of the valve plug and the space between the upper portion 34 of the valve plug and the upper portion of the valve body 12 during movement of the valve plug axially of its rotational axis. The provision of opening 74 permits ready disengagement of the valve plug from the valve body when the valve plug is unlocked, and prevents damage to the seals in the valve when the valve plug is returned to its locked and engaged position from its disengaged position.

As illustrated in FIGS. 5a-5h, the present multi-position plug valve provides eight distinct operational modes attendant to positioning of valve plug 32 in any of eight distinct positions. These are illustrated diagrammatically in FIGS. 5a-5h, in which valve plug 32 is being moved clockwise. Relative alignment of plug ports 38, 40, 42, and 44 is illustrated with respect to the valve ports 22, 24, and 26 to provide selective fluid communication between the valve ports and the main port 16 (not shown) via the interior of the valve plug 32.

Figure 5A:
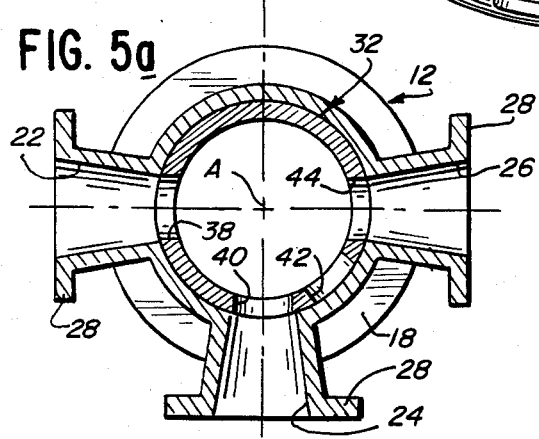

FIG. 5a shows all of the first, second, and third valve ports 22, 24, and 26 joined with main port 16. First valve port 22 communicates via first plug port 38, second valve port 24 communicates via second plug port 40, and third valve port 26 communicates via fourth plug port 44.

Figure 5B:
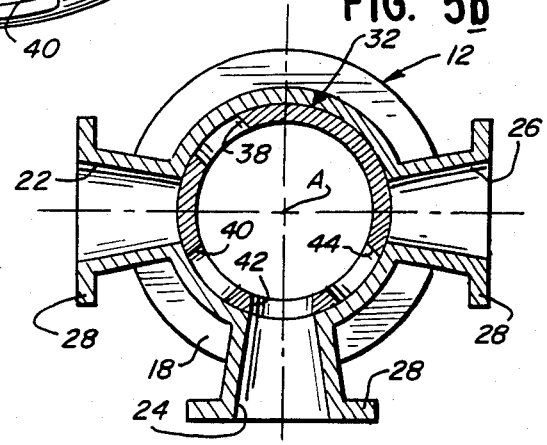

FIG. 5b shows valve plug 32 in position to provide fluid communication between second valve port 22 and main port 16 via third plug port 42, while first and third valve ports 22 and 26 are isolated from the main port 16.

FIG. 5c illustrates the provision of fluid communication between first valve port 22 and main port 16 via second plug port 40, while second valve port 24 communicates with main port 16 via fourth plug port 44. Third valve port 26 is isolated from main port 16.

FIG. 5d illustrates the joining in fluid communication of first valve port 22 with main port 16 via third plug port 42, while second and third valve ports 24 and 26 are isolated from main port 16.

FIG. 5e illustrates the position of valve plug 32 when fluid communication between first and third valve ports 22 and 26 and main port 16 is desired. First valve port 22 communicates with the main port 16 via fourth plug port 44, while third valve port 26 communicates with main port 16 via first plug port 38. Second valve port 24 is isolated from main port 16.

In FIG. 5f, valve plug 32 is illustrated in its closed position, with none of the plug ports of the valve plug aligned with any of the valve ports of the valve body. Thus, the valve ports 22, 24, and 26 are all closed and isolated from the main port 16 of the valve body.

FIG. 5g illustrates provision of communication between second and third valve ports 24 and 26 with main port 16 via first plug port 38 and second plug port 40, respectively. First valve port 22 is isolated from main port 16.

FIG. 5h shows the provision of fluid communication between third plug port 26 and main port 16 via third plug port 42. First and second valve ports 22 and 24 are isolated from main port 16.

Thus, selective rotational positioning of valve plug 32 within valve body 12: (1) places any one of the first, second, and third valve ports 22, 24, and 26 in communication with main port 16; (2) places any two of the first, second, and third valve ports in communication with the main port 16; (3) places all of the first, second, and third valve ports in communication with the main port 16; and (4) isolates all of the valve ports 22, 24, and 26 from the main port 16.

In some applications of the present multi-position plug valve, it can be desirable to provide one-way fluid flow check means for preventing flow from within the valve out of the valve ports 22, 24, and 26. The alternate embodiment of the valve plug 32 illustrated in FIG. 6 includes such an arrangement. In this embodiment, a plurality of flap-like members 80 (only two being illustrated) are provided on the interior of the valve plug, with each of the members 80 respectively aligned with one of the plug ports 38, 40, 42, and 44. Each of members 80 is suitably spring-biased such as by coil springs 82 into flow-preventing engagement across the respective plug port. In this manner, flow from the interior of the valve plug into any of the valve ports 22, 24, 26 of the valve body 12 via the plug ports of the valve plug is prevented. As will be appreciated, this is a significant optional feature of the present plug valve in that it eliminates the necessity for separate flow check mechanisms apart from the valve itself. Each of members 80 is suitably configured so as to sealingly engage skirt portion 36 of the valve plug 32 about the respective plug port in the valve plug, thus acting to prevent flow from main port 16 of the valve body into any of the valve ports 22, 24, and 26, even when the valve plug 32 is positioned within the valve body 12 to permit flow from the valve ports into the main port 16.

FIG. 6 illustrates one suitable arrangement for providing integral one-way flow check means for the present plug value. Depending upon the direction of desired fluid flow is use, the present value can be alternately provided with one or more suitable flow check mechanisms on the valve body 12 rather than within the valve plug 32.

Thus, a greatly improved multi-position plug valve is disclosed which facilitates efficient and convenient control of fluid flow. Operation of the plug valve permits selective fluid communication between any selected one or ones of the valve ports of the valve body with the main port of the body, thus permitting any desired combination of flow routing. The present valve can be readily employed in place of typical spool and pilot valves, and is suited for use in hydraulic and pneumatic systems, as well as in some types of automatic transmission systems. The valve can further be employed in many other types of diverse applications. The valve is particularly suited for use in sewage, industrial, and petroleum pumping systems, providing more versatile flow control than heretofore known three-way or four-way valves. The present plug valve can be readily fabricated, installed, and maintained, providing both cost and space savings when compared with the typical installation of three, individual isolation valves and a common header.

From the foregoing, it will be observed that numerous variations and modifications can be effected without departing from the scope of said present invention. It will be understood that no limitation with respect to the specific apparatus illustrated herein is intended or should be inferred. It is, of course, intended to cover by the appended claims all such modifications as fall within the scope of the claims.

What is claimed is:

1. A multi-position valve, comprising:
a valve body defining an interior bore and first, second, and third valve ports communicating with the interior bore, said valve body further defining a main port communicating with the interior bore of the valve body; and
plug means adapted to fit within said interior bore of said valve body for rotation with respect thereto, said plug means being selectively positionable within said valve body and including means for providing fluid communication, via the interior of said plug means, between said main port and: (1) any selected individual one of said first, second, and third valve ports; (2) said first and second valve ports only; (3) said first and third valve ports only; (4) said second and third valve ports only; and (5) all of said first, second, and third valve ports, said plug means being further positionable to isolate all of said valve ports from said main port.

2. The multi-position valve of claim 1, and one-way flow check means adapted to prevent fluid from from the interior of said plug means into said valve ports.

3. The multi-position valve of claim 1, wherein said plug means comprise a valve plug having an upper portion and depending a skirt portion, the interior of said valve plug opening into said main port of said valve body, said skirt portion defining a plurality of valve plug ports communicating with the interior of said valve plug, said plug ports being adapted for selective alignment with the valve ports of said valve body so that selective rotational positioning of said valve plug within said valve body permits selective communication of said valve ports with said main port through the interior of said valve plug.

4. The multi-position valve of claim 3, and selectively operable lock means operatively associated with said plug means for selectively preventing rotation of said plug means with respect to said valve body.

5. The multi-position valve of claim 4, and an operating shaft affixed to the upper portion of said valve plug and extending through said valve body for effecting selective positioning of said valve plug, said lock means comprising a selectively rotatable locking collar mounted for rotation on said valve body in engagement with said operating shaft, said locking collar being adapted to cooperate with said operating shaft for effecting movement of said valve plug within said valve body axially of the rotational axis of said valve plug to thereby accommodate selective movement of said valve plug into and out of locking engagement with said valve body.

6. The multi-position valve of claim 5, wherein said locking collar threadably engages said operating shaft, and said interior bore of said valve body and said skirt portion of said valve plug are each generally frusto-conical.

7. The multi-position valve of claim 5, and flow check means associated with each of said valve plug ports for preventing fluid flow from the interior of said valve plug into said valve ports of said valve body.

8. A multi-position plug valve, comprising:
a valve body having an interior bore and defining first, second, and third valve ports communicating with said bore, said valve body further defining a main port communicating with said interior bore;
a valve plug adapted to fit within the interior bore of said valve body for rotation with respect thereto, said valve plug including an upper portion and a depending skirt portion with the interior of said valve plug opening into said main port of said valve body, said skirt portion defining a plurality of plug ports and including means for providing communication between the any selected one of said valve ports and the interior of said valve plug; and
operating shaft means connected to the upper portion of said valve plug and extending through said valve body adapted to be rotated for effecting selective rotational positioning of said valve plug within said valve body to provide selective communication between said main port and: (1) any selected individual one of said first, second, and third valve ports; (2) said first and second valve ports only; (3) said first and third valve ports only; (4) said second and third valve ports only; and (5) all of said first, second and third valve ports, said valve plug being further positionable to isolate all of said valve ports from said main port.

9. The multi-position plug valve of claim 8, and plug locking means for preventing rotation of said valve plug comprising a collar mounted for rotation on said valve body and threadably engaging said operating shaft means for selectively moving said valve plug axially of its rotational axis into and out of rotation-preventing locking engagement with said valve body.

10. A multi-position plug valve comprising:
a valve body having an interior bore and defining three valve ports communicating with said bore, said valve body further defining a main port communicating with said interior bore;
a valve plug adapted to fit within the interior bore of said valve body for rotation with respect thereto, said valve plug including an upper portion and a depending skirt portion with the interior of said valve plug opening into said main portion of said valve body, said skirt portion defining a plurality of plug ports each of which is adapted to provide communication between any selected one of said valve ports and the interior of said valve plug;
an operating shaft connected to the upper portion of said valve plug and extending through said valve body adapted to be rotated for effecting selective rotation of said valve plug within said valve body to provide selective communication between any selected one and any selected ones of said valve ports and said main port, and to isolate said valve ports from said main port; and
plug locking means for preventing rotation of said valve plug comprising a collar mounted for rotation on said valve body and threadably engaging said operating shaft for selectively moving said valve plug axially of its rotational axis into and out of rotation-preventing locking engagement with said valve body;
said valve body defining first, second, and third valve ports spaced about the rotational axis of said valve plug, said first and third valve ports being diametrically opposed with respect to the rotational axis, and said second valve port being positioned intermediate said first and third valve ports and generally at right angles thereto,
said valve plug defining first, second, third and fourth plug ports spaced about the rotational axis of said valve plug, said first and fourth plug ports being diametrically opposed with respect to the rotational axis of the valve plug, said second plug port being positioned intermediate said first and fourth plug ports and at right angles thereto, and said third plug port being positioned intermediate said second and fourth plug ports,
said plug ports providing selective communication between said valve ports and said main port via the interior of said valve plug so that selective rotational positioning of said valve plug; (1) places any one of said first, second, and third valve ports in communication with said main port, (2) places any two of said first, second, and third valve ports in communication with said main port, (3) places all of said valve ports in communication with said main port, and (4) isolates said valve ports from said main port.

11. The multi-position plug valve of claim 10, wherein said upper portion of said valve plug defines an opening to accomodate equilization of fluid pressure between the interior of said valve plug and the space between said upper portion and said valve body during movement of said valve plug axially of its rotational axis.

12. The multi-position plug valve of claim 10, wherein said skirt portion of said valve plug is frusto-conical, and includes an elastomeric outer surface adapted to sealingly engage the interior bore of said valve body.

13. The multi-position plug valve of claim 8 or 10, and flow check means positioned within said valve plug comprising a plurality of flow checks respectively positioned adjacent each of said plug ports, each flow check being spring-biased into flow-preventing relation across its respective plug port to prevent flow from the interior of said valve plug into said valve ports.

14. A multi-position plug valve, comprising:

a valve body having an interior bore and defining three valve ports communicating with said bore, said valve body further defining a main port communicating with said interior bore;

a valve plug adapted to fit within the interior bore of said valve body for rotation with respect thereto, said valve plug including an upper portion and a depending skirt portion with the interior of said valve plug opening into said main port of said valve body, said skirt portion defining a plurality of plug ports each of which is adapted to provide communication between any selected one of said valve ports and the interior of said valve plug; and operating means connected to the upper portion of said valve plug and extending through said valve body adapted to be rotated for effecting selective rotation of said valve plug within said valve body to provide selective communication between any selected one and any selected ones of said valve ports and said main port, and to isolate said valve ports from said main port;

said valve body defining first, second, and third valve ports spaced about the rotational axis of said valve plug, said first and third valve ports being diametrically opposed with respect to the rotational axis, and said second valve port being positioned intermediate said first and third valve ports and generally at right angles thereto, said valve plug defining first, second, third, and fourth plug ports spaced about the rotational axis of said valve plug, said first and fourth plug ports being diametrically opposed with respect to the rotational axis of the valve plug, said second plug port being positioned intermediate said first and fouth plug ports and at right angles thereto, and said third plug port being positioned intermediate said second and fourth plug ports, said plug ports providing selective communication between said valve ports and said main port via the interior of said valve plug so that selective rotational positioning of said valve plug: (1) places any one of said first, second, and third valve ports in communication with said main port, (2) places any two of said first, second, and third valve ports in communication with said main port, (3) places all of said valve ports in communication with said main port, and (4) isolates said valve ports from said main port.

* * * * *